(12) United States Patent
Bonta et al.

(10) Patent No.: US 7,649,873 B2
(45) Date of Patent: Jan. 19, 2010

(54) METHOD AND APPARATUS FOR MERGING INDEPENDENTLY SYNCHRONIZED NETWORKS

(75) Inventors: Jeffrey D. Bonta, Arlington Heights, IL (US); George Calcev, Hoffman Estates, IL (US); James P. Michels, Elk Grove Village, IL (US)

(73) Assignee: Motorola, Inc., Schaumburg, IL (US)

( * ) Notice: Subject to any disclaimer, the term of this patent is extended or adjusted under 35 U.S.C. 154(b) by 627 days.

(21) Appl. No.: 11/278,436

(22) Filed: Apr. 3, 2006

(65) Prior Publication Data

US 2007/0086426 A1   Apr. 19, 2007

(51) Int. Cl.
*H04J 3/06* (2006.01)
*H04Q 7/20* (2006.01)

(52) U.S. Cl. .................. 370/338; 370/350; 455/41.2

(58) Field of Classification Search .......... 370/338, 370/350, 503; 375/356; 455/41.2–41.3, 455/502

See application file for complete search history.

(56) References Cited

U.S. PATENT DOCUMENTS 7,272,129 B2 *   9/2007   Calcev et al. ............... 370/338

2005/0063419 A1 *   3/2005   Schrader et al. ............. 370/466

OTHER PUBLICATIONS

Agree, J. et al.: Secure NOmadic Wireless Mesh (SnowMesh) 802.11 TGs ESS Mesh Networking Proposal, doc.: IEEE 802.11-05/596r1, May 5, 2005, pp. 1-56.
Proceedings of the 38th Hawaii International Conference on System Sciences—2005 Distributed Sleep-Scheduling Protocols for Energy Conservation in Wireless Networks.

* cited by examiner

*Primary Examiner*—Lee Nguyen (57) ABSTRACT

During operation, nodes that receive beacons from a different network will synchronize to the different network when a predetermined condition is met. Synchronization to the differing network will only take place if the node receiving the beacon from a different network does not have access to a fixed network coordinator and the predetermined condition is met. The predetermined condition may comprise such things as a Network ID for the different network being larger than the Network ID for the current network, or alternatively, the size of the different network being larger than a size of the current network.

18 Claims, 4 Drawing Sheets

METHOD AND APPARATUS FOR MERGING INDEPENDENTLY SYNCHRONIZED NETWORKS

RELATED APPLICATIONS

This application claims priority to U.S. application Ser. No. 11/249,638 filed Oct. 13, 2005.

FIELD OF THE INVENTION

The present invention relates generally to ad-hoc communication systems and in particular, to a method and apparatus for merging independently-synchronized networks.

BACKGROUND OF THE INVENTION

Synchronization of nodes within ad-hoc communication systems is critical to proper system performance. Synchronization of nodes requires that each node's internal clock be set to the same system time within some margin of error. When nodes are synchronized, power-saving techniques can be implemented. Particularly, nodes can power down (sleep) for a predetermined period of time and power up (wake) at a specified time to insure that messages can be exchanged. Nodes that synchronize with each other form an independent network. As nodes that comprise an independent network move about, there is a probability that two independently synchronized networks will overlap geographically. This is undesirable because the two networks may interfere with each other if resource allocation in each network is dependant on synchronization. Furthermore, if the two networks remain unsynchronized, then their sleep and awake periods will not coincide. This will prevent nodes in one network from communicating with nodes in the other network. Therefore, a need exists for a method and apparatus for merging independently-synchronized networks.

DETAILED DESCRIPTION OF THE DRAWINGS

In order to address the above-mentioned need, a method and apparatus for merging independently-synchronized networks is described herein. During operation, nodes that receive beacons from a different network will synchronize to the different network when a predetermined condition is met. Synchronization to the differing network will only take place if the node receiving the beacon from a different network does not have access to a fixed network coordinator and the predetermined condition is met. The predetermined condition may comprise such things as a Network ID for the different network being larger than the Network ID for the current network, or alternatively, the size of the different network being larger than a size of the current network.

The present invention encompasses a method for a node currently synchronized to a first network, having a first Network ID to synchronize to a second network having a second Network ID. The method comprises the steps of receiving a beacon containing the second Network ID, determining that the second Network ID differs from the first Network ID, determining that a condition exists that requires merging the first network with the second network, and synchronizing to the second network when the condition exists, otherwise maintaining synchronization to the first network.

The present invention additionally encompasses a method for a node currently synchronized to a first network, having a first Network ID to synchronize to a second network having a second Network ID. The method comprises the steps of receiving a beacon containing the second Network ID and an indication as to whether or not the second network utilizes a fixed network coordinator, and determining that the second Network ID differs from the first Network ID. Synchronization to the second network take s place when the first network does not have a fixed network coordinator and when the Network ID of the second network is larger than the network ID of the first network, or the second network utilizes a fixed network coordinator, or the second network is larger than the first network.

The present invention additionally encompasses an apparatus comprising a receiver receiving a beacon containing a second Network ID, and logic circuitry determining that the second Network ID differs from a first Network ID and also determining that a condition exists that requires merging the first network with the second network, and synchronizing to a second network when the condition exists, otherwise maintaining synchronization to a first network.

Figure 1:
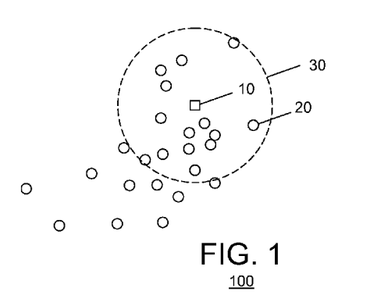
FIG. 1 is a block diagram of an ad-hoc communication system.

Turning now to the drawings, wherein like numerals designate like components, FIG. 1 illustrates an ad-hoc communication system 100. Communication system 100 preferably utilizes an ad-hoc communication system protocol defined by IEEE Standard 802. 11. However one of ordinary skill in the art will recognize that other communication system protocols may be utilized without varying from the scope of the invention. For example, communication system 100 may utilize communication system protocols such as, but not limited to, Bluetooth™, IEEE Standard 802.15.1, IEEE 802.15.3, IEEE 802.15.4, IEEE 802.16, etc. As shown, communication system 100 includes a coordinating node (sometimes referred to as a base station or access point) 10 and a nodes 20 that may or may not be in communication range with coordinating node or access-point 10. Nodes 20 can be transportable (mobile) or they can be fixed in a given place. As nodes are activated, there is a need for them to either synchronize with a coordinating node or to synchronize with neighboring nodes when the coordinating node is unavailable (e.g., out of range).

Figure 2:
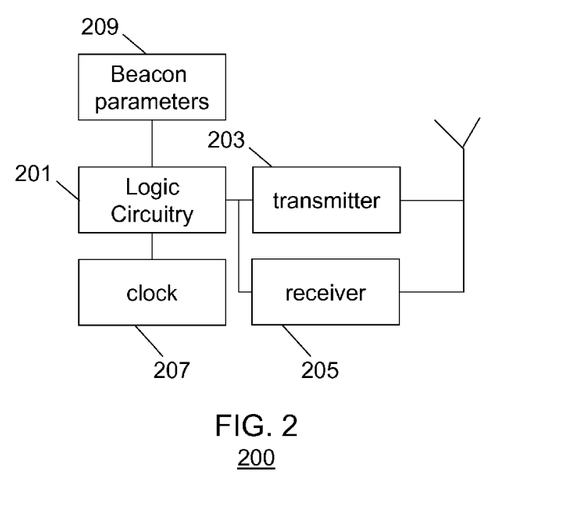
FIG. 2 is a block diagram of a node within the ad-hoc communication system of FIG. 1.

FIG. 2 is a block diagram of node 200. As shown, node 200 comprises logic circuitry 201, transmitter 203, receiver 205, clock 207, and beacon parameters database 209. During operation, logic circuitry 201 accesses receiver 205 and determines if a coordinating node's synchronization beacon can be received. If so, logic circuitry 201 accesses a timing field of the beacon and adjusts clock 207 accordingly. More particularly, after receiving a predetermined number ($N_{sync\_beacons}$) beacons, logic circuitry 201 can establish its own clock bias/offset relative to the Beacon Transmission Time received in each of the beacons. Logic circuitry 201 then adjusts its own clock relative to the clock of the coordinating node.

If a coordinating node beacon cannot be received, logic circuitry 201 accesses receiver 205 and determines if synchronization beacons from other non-coordinating nodes 20 can be received. If other nodes synchronization beacons are received, the beacons' tiers are analyzed and synchronization takes place (as described above) utilizing the beacons having the lowest tier. Beacon parameters are then updated by logic circuitry 201. Such beacon parameters include, but are not limited to:

TABLE 1

Beacon Parameters and their associated definition

| PARAMETERS | DEFINITION |
| --- | --- |
| Beacon Identification | Unique beacon ID based upon a physical address of the tier #0 node (e.g., a MAC address) |
| Tier Number | Identifies the number of hops toward the tier #0 node. |
| Beacon Interval | Interval of time between beacon transmissions |
| Beacon Transmission Time | The time of transmission of the currently received beacon |
| Beacon Transition Time | The number of beacon intervals before merging with new network. |
| network identification | Unique Network ID of synchronized nodes |
| Infrastructure Access Index | Identifies whether a mesh access point (fixed network coordinator) is part of the current synchronized network |
| Network Merge Indication | Indicates that a merge of two independently synchronized networks is occurring when set. |
| Relative Network Size | Optional field that corresponds to an estimate of the synchronized network size |
| Network Size Sequence Number | Optional sequence number incremented each time a node adjusts the Relative Network Size field |

If, however, no coordinating device is heard, and after a predetermined period of time ($T_{presync}$) no beacon is heard from non-coordinating nodes, node 200 will become a first tier (tier #0) node. Beacon parameters are updated accordingly by logic circuitry 201 to reflect this. Logic circuitry 201 will then instruct receiver 205 to periodically transmit the tier #0 beacon with a beacon ID based upon the physical address of the tier #0 node. (A physical address is a hardware address that uniquely 10 identifies each node of a network and is unchanging. Such an address is usually "hard wired" into the node during its manufacture. In networks using an IEEE 802.11 protocol, the physical address comprises a Medium Access Controller (MAC) address).

No matter what tier # a node's beacon currently is associated with, all nodes 15 in the network share the responsibility of periodically broadcasting beacons at beacon intervals relative to the adjusted clock. If a neighboring node hears the beacons, it will synchronize to the beacon having the lowest tier #, and begin transmitting its own synchronization beacon with a beacon ID based upon the Medium Access Controller Address of the tier #0 node.

Figure 3:
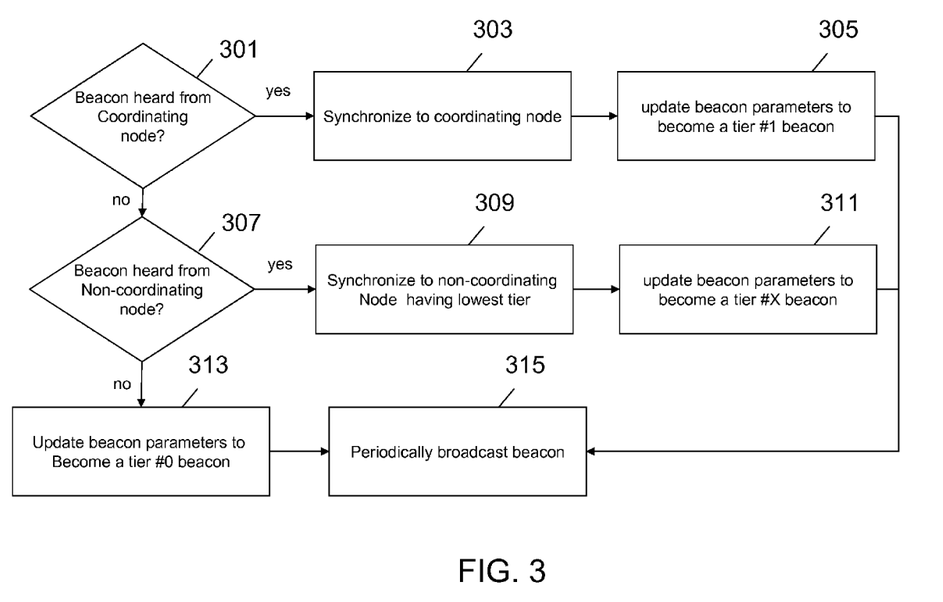
FIG. 3 is a flow chart showing operation of the node of FIG. 2.

FIG. 3 is a flow chart showing operation of node 200 during synchronization. It is assumed that receiver 205 periodically scans (listens) for a plurality of beacons transmitted from a plurality of nodes. The logic flow begins at step 301 where logic circuitry 201 accesses receiver 205 and determines if a beacon is heard from a coordinating node 10 (i.e., a tier #0 node). If so, the logic flow continues to step 303 where synchronization takes place utilizing the coordinating node's beacon and the logic flow continues to step 305 where logic circuitry updates beacon parameters to become a tier #1 beacon. The logic flow then continues to step 315.

If, at step 301, no coordinating node's beacon is heard, the logic flow continues to step 307 where logic circuitry 201 accesses receiver 205 and determines if beacons from non-coordinating nodes are heard. If so, the logic flow continues to step 309 where logic circuitry 201 determines a tier for each beacon heard and synchronizes to the beacon(s) having the lowest tier ($TIER_{LOWEST}$). The logic flow then continues to step 311 where logic circuitry 201 updates beacon parameters to become a tier #X beacon, where X is a numeral incremented by one from $TIER_{LOWEST}$. The logic flow then continues to step 315.

Returning to step 307, if logic circuitry 201 determines that no synchronization beacons are heard, then the logic flow continues to step 313 where logic circuitry updates beacon parameters to become a tier #0 node (e.g., first tier, or Tier Number =0 node). The logic flow continues to step 315.

At step 315 logic circuitry creates a synchronization beacon comprising a beacon identification and the tier number and instructs transmitter 203 to periodically broadcast the synchronization beacon. As discussed above, the beacon identification comprise a physical address (e.g., a MAC address) of the tier #0 node.

Synchronization Maintenance

In a synchronization maintenance mode, each node 200 continuously monitors the Beacon Transmission Time received in beacons from neighboring nodes to determine if a beacon exists having a lower tier than the beacon utilized for synchronization. Once beacons are identified containing a lower tier number, node 200 begins to reestablish synchronization with these beacons. When $N_{sync\_beacons}$ beacons are received, node 200 can reestablish its own clock bias/offset relative to the Beacon Transmission Time received from each of the beacons with a lower tier number. The node then adjusts its own clock relative to the clock of node 200 that transmitted the beacons. Once synchronization is reestablished, node 200 will always send future beacons with a tier number one greater than the tier of the beacon it synchronized with. If no beacons are received from a node with a lower tier number, then four possible scenarios develop:

1) If node 200 currently has a Synchronization Tier Number of zero, then node 200 will continue to represent the reference clock and will continue to broadcast beacons.

2) If node 200 currently has a Synchronization Tier Number of 1, then node 200 will reestablish synchronization with a node with either an equal tier number or a larger tier number, giving preference to the smallest possible tier number. After receiving $N_{sync\_beacons}$ beacons, node 200 will average the beacon times to reestablish its own clock bias/offset relative to the Beacon Transmission Time received. Once synchronization is reestablished, node 200 will always send future beacons with a tier number one greater than the tier of the beacon it synchronized with.

3) If node 200 has a Synchronization Tier Number greater than 1, then node 200 first attempts to reestablish synchronization with a node having an equal Synchronization Tier Number. After receiving $N_{sync\_beacons}$ beacons with an equal Synchronization Tier Number, node 200 will average the beacon times to reestablish its own clock bias/offset relative to the Beacon Transmission Time received. The node will rebroadcast beacons using the same Synchronization Tier Number.

4) If node 200 has a Synchronization Tier Number greater than 1 and there are no beacons with lower or equal Synchronization Tier Numbers, then node 200 is considered orphaned.
   a. If the Infrastructure Access Index indication (a zero indicates that an access point can be reached via single or multiple hops through nodes in the synchronized network) is set to zero in all received beacons with a greater Synchronization Tier Number, then node 200 will start a resynchronization procedure after a timeout $T_{resync\_period}$.
   b. If the Infrastructure Access Index indication is non-zero in beacons received with a greater Synchronization Tier Number, then node 200 will reestablish synchronization with a node with a larger tier number, giving preference to the smallest possible tier number. After receiving $N_{sync\_beacons}$ beacons, node 200 will average the beacon times to reestablish its own clock bias/offset relative to the Beacon Transmission Time received. Once synchronization is reestablished, node 200 will always send future beacons with a tier number one greater than the beacon that it synchronized with.

In synchronization maintenance mode, all nodes in the network share responsibility to send beacons relative to the adjusted clock. Additionally, all nodes shall rebroadcast beacons with the same Network ID, Beacon ID, Beacon Interval, and Infrastructure Access Index indication values that were received in beacons which node 200 utilized for synchronization. Additionally, all nodes randomly set a timeout to force a resynchronization of the network after at least $T_{resync\_period}$ seconds.

Resynchronization

The resynchronization procedure ensures that the node's reference clock 207 is maintained and that the tier #0 node that all other nodes synchronize to is periodically changing. This is particularly useful if node 200 has disconnected or is moving away from the synchronized network. Resynchronization is performed periodically (after a timeout equal to $T_{resync\_period}+T_{resync\_period}*$random interval) or on demand. It is a procedure that is self appointed by any node except for the current reference (tier #0) node.

During resynchronization, a new beacon ID (based on the self appointed node's MAC address) is broadcast in the self appointed node's beacons. All nodes that receive a beacon with a new beacon ID and the same Network ID (regardless of the tier number they are currently affiliated with) will recognize the beacon as a resynchronization procedure.

Figure 4:
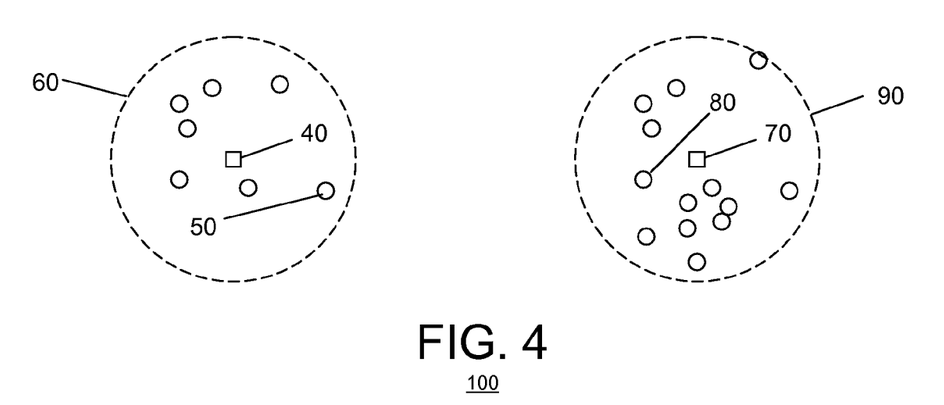
FIG. 4 illustrates two groups of nodes synchronized to differing reference nodes.

When each node receives the resynchronization beacon, it shall add a backoff timer of $T_{resync\_backoff}$ seconds to its current resynchronization period timer $T_{resync\_period}$, thus delaying its attempt to force resynchronization of the network with its clock being used as the reference clock. When each node receives the resynchronization beacon, it synchronizes with beacons containing the smallest tier number as described above Merging Networks As synchronized nodes move about, a merge of independently synchronized groups of nodes with different network identifications may be necessary as the groups come together. This merge will enable the two networks to use a common reference clock. FIG. 4 illustrates an ad-hoc communication system 100 composed of two independently synchronized groups of nodes 60 and 90, each deriving their clock reference from nodes 40 and 70 respectively.

A network identification, such as a base station ID uniquely identifies a network of synchronized nodes. Within a synchronized network, resynchronization will alter the beacon ID. There is a need to also uniquely identify a network so that when two networks come together, the need to merge is recognized. Without this, if a node saw a different beacon ID, it would think this is a resynchronization rather than a merging of networks. Because of this, in the present invention, each node will broadcast both a beacon ID and a Network ID as part of the beacon.

To provide a consistent approach for a merge of these networks, the network identification is used to determine which network will maintain the reference synchronization clock and which must resynchronize to the reference clock. The method for detecting the need for a merge is triggered by the reception by a node of a beacon with a network identification that is different than the one it currently is synchronized with. Upon recognizing the presence of another network with a differing network identification, node 200 will compare both the Infrastructure Access Index indication and the network identification in the beacon received from the other network with its own copy of these parameters to determine if a network merge is required. As discussed above, an infrastructure access index is a bit within the beacon that identifies whether a fixed network coordinator (i.e., a fixed tier #0 node) is part of the current synchronized network.

Figure 5:
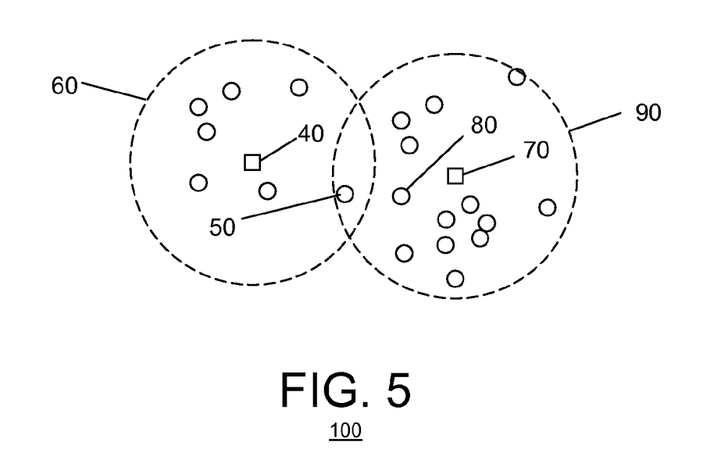
FIG. 5 illustrates two groups of nodes synchronized to differing reference nodes.

For example, FIG. 5 illustrates an ad-hoc communication system 100 with coordinating nodes 40 and 70 that provide independent synchronization to nodes within clusters 60 and 90 respectively. As shown, cluster 60 has fewer nodes than cluster 90 and nodes 50 and 80 are in close proximity to each other. When node 50 receives a beacon from node 80, node 50 will examine the network identification received within the beacon. Since these are two independently synchronized networks, the network identification contained within the beacon from node 80 will be different than node 50's network identification. Using the network identification and the Infrastructure Access Index indication received in the beacon, node 50 will compare these parameters with its own copy of these parameters to determine whether a network merge is required. Each node 200 will initiate the following general tests to compare the received beacon parameters with its beacon parameters database 209.

If the Infrastructure Access Index indication is set in the local node's network, then there shall be no attempt by node 200 to merge its network with the other network (i.e. the local network will maintain its current clock reference). Thus, if a node is synchronized to a fixed network coordinator, no merging takes place.

If the Infrastructure Access Index indication being broadcast by the other networks' beacons is set (i.e. the nodes from the other network have membership with a fixed network coordinator/access point), then the network that does not have membership with a fixed network coordinator must resynchronize to the reference clock of the network that does have membership with a fixed network coordinator. Thus, a network merge is required as defined below.

If the Infrastructure Access Index indication is set in both networks (i.e. both networks have membership with a fixed network coordinator), then there shall be no attempt to merge networks.

If the network identification from the other network's beacon is larger than node 200's current copy of the network identification, then a network merge is required as defined below.

If the network identification from the other network's beacon is smaller than node 200's current copy of the network identification, then node 200 will discard the information received in the beacon from the other network and will remain in synchronization maintenance mode looking for beacons with the same network identification.

Referring again to FIG. 5, when a network merge is required, then node 50 will set the Network Merge indication in its beacon for the next $N_{merge\_announce}$ beacons. The beacon's network identification field shall also contain the network identification that identifies the new network to be merged into (i.e. the network identification of network 90). The Beacon Transition Time in the beacon will be initialized to the count of $N_{merge\_announce}$ beacon intervals.

Beginning with node 50, each node within network 60 that receives the beacon with the Network Merge indication set shall broadcast up to $N_{merge\_announce}$ beacons with the Network Merge indication set provided that its'current network identification is different than the one contained in the network identification field of the received beacon. For each beacon interval that passes during the broadcast of beacons with the Network Merge indication set, the Beacon Transition Time will be decremented. Additionally, the Network Merge indication in the received beacon requires each recipient whose network identification is different than the one contained in the network identification field of the received beacon to come out of power save mode (if applicable) for a maximum of $N_{merge\_awake}$ beacon intervals in order to increase the likelihood of hearing beacons and promoting a rapid merge of networks. In the preferred embodiment, beacons shall be broadcast in synchronization with the current clock that is derived from coordinating node 40.

After broadcasting $N_{merge\_announce}$ beacons, node 50 will begin to synchronize with the new network 90. Synchronization with the new network contained in the network identification field will occur as discussed previously. Each other node will synchronize with the new network 90 after Beacon Transition Time beacon intervals have passed. Once each node 200 synchronizes with beacons containing the new network identification from the network identification field, it updates its own copy of the network identification in its beacon parameters database 209 with the new network identification, clears the Network Merge indication, and returns to power save mode (if desired). In an alternate embodiment, $N_{merge\_announce}$ beacons are broadcast after synchronizing to the new network 90.

In an alternate embodiment, the requirement for a network merge may be assessed based upon a combination of the Infrastructure Access Index indication and the relative ad-hoc network size rather than a combination of the Infrastructure Access Index indication and the absolute value of the network identification. Thus, when the presence of a different network is detected based on the network identification of a received beacon, an optional beacon parameter (Relative Network Size) containing a representation of the relative size of the adjacent network is compared with the receiving node's estimation of the network size. One implementation of the Relative Network Size is a bit map where each bit is a hashed index of an ad-hoc network node's MAC address. The number of bits is engineered for desired accuracy. In this alternative embodiment, the number of bits that are set represents the size of the network. Alternatively, the actual network size may be computed and used as the Relative Network Size. An additional optional beacon parameter called the Network Size Sequence Number is also required to maintain the Relative Network Size. The Network Size Sequence Number is a beacon parameter that accompanies the Relative Network Size beacon parameter.

During initial synchronization and synchronization maintenance, each node adds its own bit to the other bits in the Relative Network Size bit map received in a beacon (initially all bits are set to zero) provided that the Network Size Sequence Number received in the beacon is larger than the Network Size Sequence Number last broadcast in a beacon by node 200. Once node 200 adds a bit to the Relative Network Size, it increments its own copy of the Network Size Sequence Number before broadcasting the next beacon. If the representation of the Relative Network Size from the other network's beacon is larger than node 200's current copy of the Relative Network Size, then a network merge is required. If the representation of the Relative Network Size from the other network's beacon is smaller than node 200's current copy of the Relative Network Size, then node 200 will discard the information received in the beacon from the other network and will remain in synchronization maintenance mode looking for beacons with the same network identification. From FIG. 4, network 60 is smaller than network 90. When node 50 receives a beacon from a node 80 within network 90, node 50 will first compare the network identification, Infrastructure Access Index indication, and Relative Network Size parameters with its own copy of these parameters to determine whether a network merge is required with the following general tests.

If the Infrastructure Access Index indication is set in the local node's network, then there shall be no attempt by node 200 to merge its network with the other network (i.e. the local network will maintain its current clock reference).

If the Infrastructure Access Index indication being broadcast by the other networks' beacons is set (i.e. the nodes from the other network have mesh membership with a fixed network coordinator/access point), then if network does not have membership with a fixed network coordinator, it must resynchronize to the reference clock of the network that does have membership with a fixed network coordinator. Thus, a network merge is required as defined previously.

If the Infrastructure Access Index indication is set in both networks (i.e. both networks have membership with a fixed network coordinator), then there shall be no attempt to merge networks.

If the Relative Network Size from the other network's beacon is larger than node 200's current estimate of the relative network size (i.e. number of synchronized nodes), then a network merge is required as defined previously.

If the Relative Network Size from the other network's beacon is smaller than node 200's current estimate of the relative network size (i.e. number of synchronized nodes), then node 200 will discard the information received in the beacon from the other network and will remain in synchronization maintenance mode looking for beacons with the same network identification.

Finally, a periodic reset of the Relative Network Size bit map contained with node 200's memory is recommended during synchronization maintenance. Any node can initiate this reset. A node will reset the Relative Network Size bit map (thus initializing the network size representation), set its own bit, and then increment the Network Size Sequence Number. Once a surrounding node hears the beacon with an incremented sequence number, it knows that it should add its bit to the map and propagate the new Relative Network Size bit map in subsequent beacons that it broadcasts.

Figure 6:
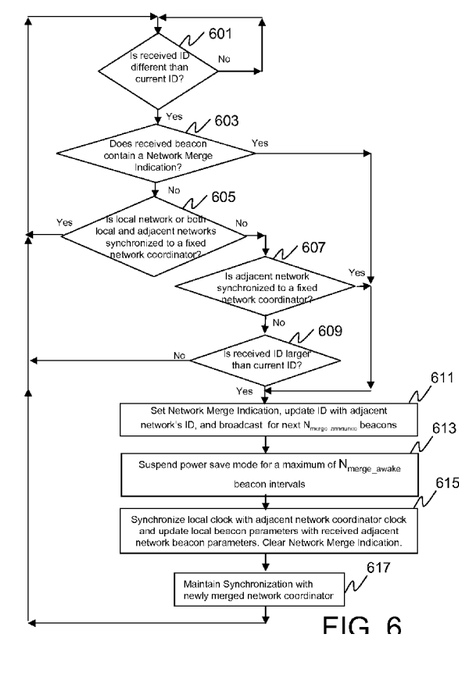
FIG. 6 is a flow chart showing operation of the node of FIG. 2.

FIG. 6 is a flow chart showing operation of node 200. The logic flow begins at step 601 where, after receiving a beacon, logic circuitry 201 determines if the Network ID differs from the current Network ID. This is accomplished by logic circuitry 201 accessing database 209 to determine a current Network ID, and comparing the current Network ID to the Network ID received in the beacon. If, at step 601 it is determined that the Network IDs are similar, then the logic flow returns to step 601, otherwise the logic flow continues to step 603.

At step 603, logic circuitry 201 determines if the beacon contains a Network Merge Indication. As discussed above, the Network Merge Indication indicates that a merge of two independently synchronized networks is occurring when set. If, at step 603, logic circuitry determines that the network merge indication is set, the logic flow continues to step 611, otherwise, the logic flow continues to step 605.

At step 605, logic circuitry 201 determines its network (local network) or both the local and adjacent networks are synchronized to a fixed network coordinator (as opposed to a non-stationary network coordinating node). If this is true, then no merging takes place. However, if this is not true, the logic flow continues to step 607.

At step 607 logic circuitry 201 determines if the adjacent network is synchronized to a fixed network coordinator, and if so, the logic flow continues to step 611, otherwise the logic flow continues to step 609 where logic circuitry 201 determines if the Network ID received in the beacon is larger than the current Network ID. If, at step 609, the Network ID is not larger than the current Network ID, then no merging takes place and the logic flow returns to step 601, otherwise the logic flow continues to step 611.

At step 611, logic circuitry creates a beacon indicating a network merge is taking place by setting the Network Merge Indication Field. Logic circuitry also updates the Network ID with the adjacent network's Network ID, and then instructs transmitter 203 to transmit the new beacon for the next $N_{merge\_announce}$ beacons. The logic flow then continues to step 618.

At step 613 power savings is suspended and at step 615 logic circuitry 201 performs synchronization with the adjacent network and updates local beacon parameters with the received adjacent network's beacon parameters. The network Merge Indication is also cleared at step 613. Finally, at step 617 synchronization is maintained with the newly merged network coordinator.

As is evident, nodes within communication system 100 that are communicating with a first network will receive a beacon containing a differing (second) Network ID and determine that the second Network ID differs from the first Network ID. A determination is made as to whether or not a condition exists that requires merging the first network with the second network, and synchronization to the second network takes place when the condition exists.

As discussed above, the step of determining that the condition exists comprises the step of determining that the second Network ID is larger than the first Network ID. Alternatively, the step of determining that the condition exists may comprise the step of determining that the second network is larger than the first network, as described in FIG. 7. The Network IDs may comprise base station IDs. The above logic flow also results in synchronizing to the second network only when it is determined that the first network is not synchronized to the fixed network coordinator and when the condition exists.

Figure 7:
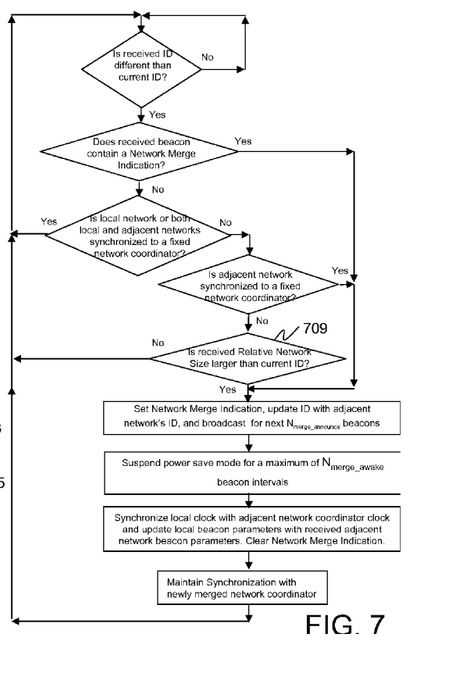
FIG. 7 is a flow chart showing operation of the node of FIG. 2.

FIG. 7 is a flow chart showing operation of node 200 during network merging in accordance with the alternate embodiment of the present invention. As discussed above, in the first embodiment of the present invention, a node is merged to an adjacent network when the adjacent network's Network ID is larger than the currently utilized Network ID. In the alternate embodiment of the present invention, a node is merged to an adjacent network when the adjacent network's size is larger (i.e., has a greater number of nodes) than the current network. As is evident, the logic flow of FIG. 7 is identical to the logic flow of FIG. 6 except that step 709 has replaced step 609. At step 709 logic circuitry 201 determines if the network size indication received in the beacon is larger than the current network size. If, at step 709, the Network ID is not larger than the current Network ID, then no merging takes place and the logic flow returns to step 601, otherwise the logic flow continues to step 611.

Synchronization Procedure (Partial Network Coordinator Coverage Available)

When a node moves in and out of coverage of a network coordinator, three possible scenarios exist for synchronization and association. The node is either, a) unsynchronized with any network, b) synchronized with a non-network coordinator reference clock, or c) synchronized with a network coordinator reference clock. These 3 scenarios will be addressed below.

Merging Unsynchronized Node into a Mesh Service Area

This first scenario does not require any change from the current method of association and synchronization of a node with a network coordinator (i.e. becoming a mesh member of a network coordinator). This occurs with mobility or power on scenarios and only applies to single hop synchronization. Once node 200 becomes a mesh member of the network coordinator, it will set its Synchronization Tier Number to 1 (the network coordinator will always be a tier #0 node) and the Infrastructure Access Index indication will be set to 1.

Merging IBSS Synchronized Node into Mesh Membership with a Network Coordinator

This scenario represents the transition from a disconnected mesh to a connected mesh. This occurs when a node is synchronized with other nodes outside of mesh membership with a network coordinator, and is now able to receive beacons from a network coordinator (i.e. IBSS synchronized nodes desire to synchronize with network coordinator). These IBSS synchronized nodes may be sleeping in power save mode. Since it is likely that their beacons are being broadcast asynchronously to the network coordinator beacons, every $T_{BSS\_search}$ beacon seconds they shall periodically remain out of power save mode for $N_{BSS\_search}$ beacon intervals. The non-power save time will enable any IBSS synchronized node to have the opportunity to recognize that mesh membership with a network coordinator is available. Hence, when a node without network coordinator mesh membership receives a beacon with a different Network ID and a Infrastructure Access Index indication that is set to 1.

Dropping Mesh Membership with a Network Coordinator

This scenario represents the possible transition from a connected mesh to a disconnected mesh. This occurs if a tier #1 node with mesh membership to a network coordinator stops receiving beacons from tier #0 (i.e. the network coordinator). This scenario has two possible outcomes:

1) If node 200 has a tier number of 1, it will begin broadcasting beacons using the same tier number, but with its Infrastructure Access Index indication set to zero.
2) If node 200 has a tier number greater than 1, node 200 will perform "Synchronization Maintenance" with the following rule modifier. If node 200 is receiving beacons from neighboring nodes with a smaller or equal tier number and with conflicted Infrastructure Access Index indications set to either zero or 1, node 200 will only synchronize with those beacons that have a Infrastructure Access Index indication set to 1.

Once a node stops receiving beacons from any lower, equal, or higher tier nodes with the Infrastructure Access Index indication set to 1, then the WLAN mesh is entering a disconnected mesh state. At this time, node 200 can start a timer $T_{resync\_period}$ to prepare for a resynchronization of the network.

While the invention has been particularly shown and described with reference to a particular embodiment, it will be understood by those skilled in the art that various changes in form and details may be made therein without departing from the spirit and scope of the invention. For example, the above logic flow results in synchronizing to the second network only when it is determined that the first network is not synchronized to the fixed network coordinator and when the condition exists. Alternatively, synchronization may be allowed simply when the condition exists regardless as to whether or not the synchronization is with a fixed network coordinator. It is intended that such changes come within the scope of the following claims.

The invention claimed is:

1. A method for a node currently synchronized to a first network, having a first Network ID to synchronize to a second network having a second Network ID, the method comprising the steps of:
   receiving a beacon containing the second Network ID;
   determining that the second Network ID differs from the first Network ID;
   determining that a condition exists that requires merging the first network with the second network;
   synchronizing to the second network when the condition exists, otherwise maintaining synchronization to the first network; and
   determining if the first network is synchronized to a fixed network coordinator; and
   wherein the step of synchronizing to the second network when the condition exists comprises the step of synchronizing to the second network only when it is determined that the first network is not synchronized to the fixed network coordinator and when the condition exists.

2. The method of claim 1 wherein the step of determining that the condition exists comprises the step of determining that the second Network ID is larger than the first Network ID.

3. The method of claim 1 wherein the step of determining that the condition exists comprises the step of determining that the second network is larger than the first network.

4. The method of claim 1 wherein the step of determining that the condition exists comprises the step of determining conditions taken from the group consisting of determining that the second Network ID is larger than the first Network ID and determining that the second network is larger than the first network.

5. The method of claim 1 wherein the first and the second Network IDs comprise a first and a second base station ID.

6. The method of claim 1 wherein the step of determining that the condition exists comprises the step of determining that the second Network ID is larger than the first Network ID.

7. The method of claim 1 wherein the step of determining that the condition exists comprises the step of determining that the second network is larger than the first network.

8. The method of claim 1 wherein the step of determining that the condition exists comprises the step of determining conditions taken from the group consisting of determining that the second Network ID is larger than the first Network ID and determining that the second network is larger than the first network.

9. The method of claim 1 wherein the step of synchronizing to the second network occurs after a transition timer expires.

10. A method for a node currently synchronized to a first network, having a first Network ID to synchronize to a second network having a second Network ID, the method comprising the steps of:
    receiving a beacon containing the second Network ID and an indication as to whether or not the second network utilizes a fixed network coordinator;
    determining that the second Network ID differs from the first Network ID;
    synchronizing to the second network when the first network does not have a fixed network coordinator and a condition exists from the group consisting of:
      the Network ID of the second network is larger than the network ID of the first network;
      the second network utilizes a fixed network coordinator; and
      the second network is larger than the first network.

11. The method of claim 10 wherein the first and the second Network IDs comprise a first and a second base station ID.

12. An apparatus comprising:
    a receiver receiving a beacon containing a second Network ID;
    logic circuitry determining that the second Network ID differs from a first Network ID and also determining that a condition exists that requires merging the first network with the second network, and synchronizing to a second network when the condition exists, otherwise maintaining synchronization to a first network; and
    wherein the logic circuitry additionally determines if the first network is synchronized to a fixed network coordinator and synchronizes to only when it is determined that the first network is not synchronized to the fixed network coordinator and when the condition exists.

13. The apparatus of claim 12 wherein the condition comprises the second Network ID being larger than the first Network ID.

14. The apparatus of claim 12 wherein the condition comprises the second network being larger than the first network.

15. The apparatus of claim 12 wherein the condition is taken from the group consisting of the second Network ID being larger than the first Network ID and the second network being larger than the first network.

16. The apparatus of claim 12 wherein the first and the second Network IDs comprise a first and a second base station ID.

17. The apparatus of claim 12 wherein the condition comprises the second Network ID being larger than the first Network ID.

18. The apparatus of claim 12 wherein the condition comprises the second network being larger than the first network.

* * * * *